A. S. SPIEGEL.
AUTOGRAPHIC CAMERA.
APPLICATION FILED DEC. 2, 1914.
1,270,983.
Patented July 2, 1918.
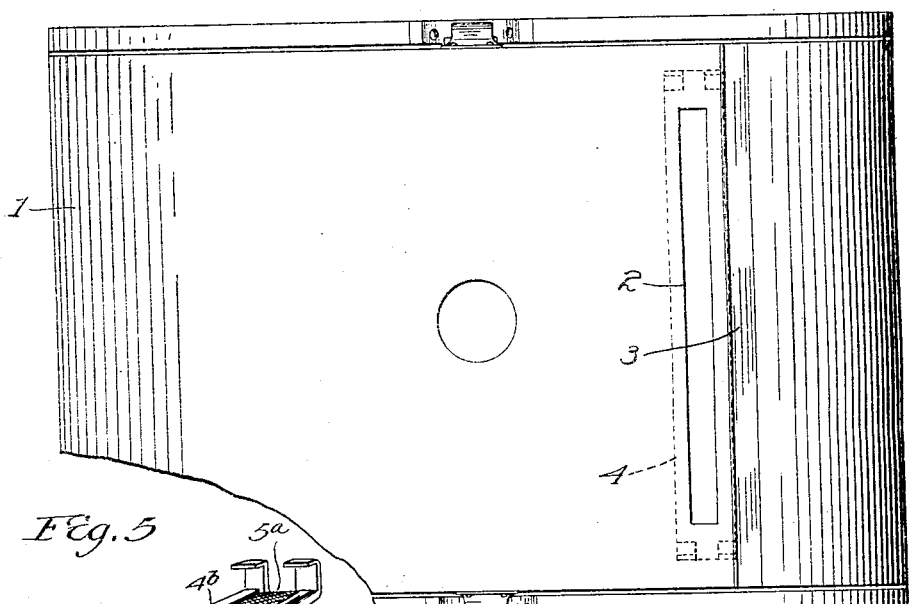
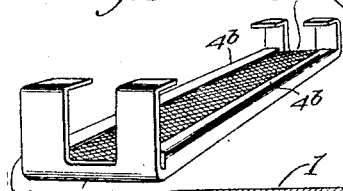
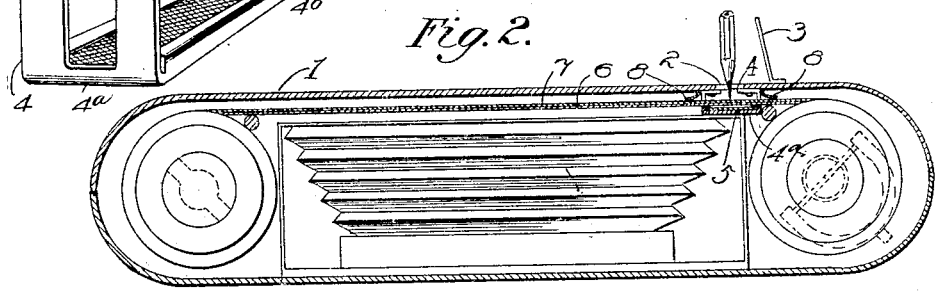
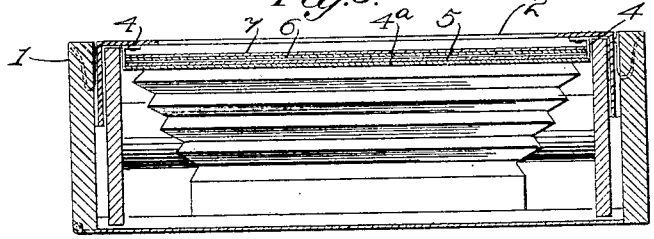
Inventor:
Alexander S. Spiegel.

UNITED STATES PATENT OFFICE.

ALEXANDER S. SPIEGEL, OF CHICAGO, ILLINOIS.

AUTOGRAPHIC CAMERA.

1,270,983.

Specification of Letters Patent. Patented July 2, 1918.

Application filed December 2, 1914. Serial No. 875,163.

*To all whom it may concern:*

Be it known that I, ALEXANDER S. SPIEGEL, a citizen of the United States, residing at Chicago, Illinois, have invented certain new and useful Improvements in Autographic Cameras, of which the following is a specification.

My present invention relates to improvements in what are well known as autographic cameras, or those in which a record may be made on a film at or about the time of exposure, of the subject, time and place, or any other desirable data.

In devising this invention, I have aimed to provide a construction which will enable the ordinary film to be used, and which will not interfere with the camera being loaded or unloaded by day-light. I have also aimed to provide for the writing or marking being done in bright day-light and in such a manner that it is not necessary to expose the written portion in order to make a record of the writing.

With these and other objects in view, which will appear more fully in the following specification, the invention includes the novel features of construction and arrangement and combination of parts hereinafter described and particularly defined in the appended claims.

I have illustrated an embodiment of my invention in the accompanying drawing, in which, Figure 1 is a plan view of the back of a film camera.

Fig. 2 is a transverse sectional view.

Fig. 3 is a transverse section taken along the line of opening 2.

Fig. 4 is a sectional detail.

Fig. 5 is a perspective detail of a modification.

Referring by reference characters to these drawings the numeral 1 designates a film camera of the ordinary or any desired form. In the back of the camera and at a suitable point, the location of which depends somewhat upon the portion of the film where it is desirable to have the marking occur, I provide an opening, preferably in the form of an elongated slot, as shown at 2 which may normally be closed by a hinged cover 3. Within the back and in line with this opening, I provide a holder 4 for supporting a marking surface, which may be a carbon or like transfer surface, which is indicated at 5. The holder 4 is supported by suitable brackets from the back of the camera at the ends of the slot so that the film 6 and black paper 7 can be carried through between the marking surface and the slot or opening 2 in their passage from one roll to the other. The bottom of the holder 4ª is formed as a plane flat surface for supporting the marking surface and overturned portions or clips 4ᵇ are provided to engage the side edges of the said marking surface and hold it in position and also to hold the surface of the film normally out of contact with said surface. Spring packing strips may be also provided on the back of the camera adjacent to the slot or opening as indicated at 8 to prevent the light which passes into the slot or opening from reaching the interior of the camera. With a construction as above described, and using a carbon sheet for the marking surface, in order to write upon or mark a film for identification purposes, it is only necessary before exposing the film to open the hinged cover and write upon the back of the black paper with a hard pencil or stylus. As the black paper and film are both flexible, the pressure of the pencil or stylus will cause the carbon to adhere to the gelatinous coating of the film at those points directly opposite to where the pencil or stylus bears. Thus the mere writing upon the back of the black paper with a sharp pointed instrument will cause the written matter to appear in black carbon characters on the sensitive surface and if the film be thereafter moved to carry the portion bearing the carbon into range of the exposure opening, this carbon will upon the subsequent exposure of the film prevent the light from acting on the film, the carbon marks being opaque.

In this form of my invention, it is necessary that the marks or writing should be made upon the film before it is moved to exposure position, and that it should after the writing be moved sufficiently to carry the written portion from over the carbon surface and into position to receive the light passing through the lens. The carbon will of course, be washed off by the developer, which latter, acting on the underlying unexposed sensitive surface, will cause this portion to contrast with the surrounding portions of the sensitive surface which have been exposed to the light. In other words, the markings will appear light on the film and black on the photographic prints.

The writing slot or window may be conveniently placed opposite the framework which holds the bellows.

Instead of using carbon paper, I may use a chemically prepared paper which will leave a dark or black mark on the surface of the film, which cannot be washed away by the chemical. In this event, the black marks appearing on the film, will cause the markings on the photographic prints to appear in white.

With this method of marking, it is not necessary to expose the marked portion and hence the marking can be effected either before or after exposure.

Instead of marking the film by applying a marking coating thereto, I may effect the marking by removing the sensitive surface. This may be accomplished by substituting for the carbon or like surface an abrasive surface 5ª as shown in Fig. 5. This abrasive surface may be either a piece of emery cloth or like abrasive material inserted in the holder in place of the carbon sheet, or it may be in the shape of a fine file. With such a surface, writing on the back of the black paper will press the emulsion of the film against the surface of the emery cloth or file, and, as the emulsion is very brittle, wherever it contacts with the sharp edges of the file or other surface, it will chip off, leaving the celluloid without any coating, so that the marks will appear white on the developed film and will print black on the picture.

The overhanging portions or flanges 4ᵇ will hold the film normally out of contact with the abrasive surface and prevent injury thereto.

When an abrasive surface is used, or a transfer which adheres permanently to the film, the slot or window may be placed at the side of the camera adjacent the winding spool, as shown in the drawing and the markings effected after exposure.

When, however, a carbon marking surface is used, it is generally preferable to have the window and holder located at the opposite side of the back so that after marking the ordinary movement of the winding spool would bring the carbon coated portion of the film into position to be exposed simultaneously with the taking of the picture.

It will be obvious that by my method, the film may be marked at any suitable or desired point, as it is not necessary that it should be between exposed portions of the film. While I have shown the slot or window at one end of the back and transversely thereof, I do not limit myself in any way to the relative location of the window.

As my improved attachment may be carried entirely by the removable back, it can be readily applied to the cameras already on the market.

I am aware of the British patent of Gaisman #9006 of April 9, 1914, which shows a method of forming a signature or other mark or designation on a film by exposing a portion of the back of the film through openings formed by displacing with a stylus certain lines or areas of a carbon coated surface. I hereby disclaim the disclosure of this patent as my invention relates not to a light printing method of applying a signature or designating mark to a film but pertains to mechanically operated means for making an impression on a sensitive surface of a film, which will produce a desired mark on the developed negative and which is not in any way dependent upon the use of light for its resultant effect.

What I claim is:—

1. A film camera having an opening through which a stylus may be inserted into contact with the film backing, a holder in line with said opening, said holder having a flat surface and overtured side edges, a sheet of material designed to act on the film and having its margins held by said overtured edges of the holder, said edges also normally holding the film spaced from said sheet, and projections at the ends of the holder securing it to the back of the camera.

2. A film camera having an opening through which a stylus may be inserted into contact with the film backing, and a holder for a sheet of abrasive material, said holder having a flat surface and overtured side edges, a sheet of abrasive material having its side margins held under said overturned edges of the holder, said edges also normally holding the film spaced from said abrasive sheet, and integral projections at the ends of the holder for securing it to the back of the camera.

In testimony whereof, I affix my signature in presence of two witnesses.

ALEXANDER S. SPIEGEL.

Witnesses:
C. R. OLSON,
ARTHUR M. JOHNSON.